(12) United States Patent
King et al.

(10) Patent No.: US 8,045,995 B2
(45) Date of Patent: Oct. 25, 2011

(54) CENTRALIZED LOCATION BROKER

(75) Inventors: Simon P. King, Berkeley, CA (US); Paul Hammond, San Francisco, CA (US); Tom Coates, London (GB); Simon Willison, Oxford (GB); Rahul Nair, Oakland, CA (US); Shane Ahern, Foster City, CA (US); Mor Naaman, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 809 days.

(21) Appl. No.: 11/755,998

(22) Filed: May 31, 2007

(65) Prior Publication Data

US 2008/0299989 A1    Dec. 4, 2008

(51) Int. Cl.
*H04W 24/00* (2009.01)

(52) U.S. Cl. .............. 455/456.1; 455/404.2; 455/414.2; 455/456.2; 455/456.5

(58) Field of Classification Search ............... 455/414.2, 455/456.1, 456.2, 456.5, 404.2
See application file for complete search history.

(56) References Cited

U.S. PATENT DOCUMENTS

| | | | |
|---|---|---|---|
| 6,321,092 B1 | 11/2001 | Fitch et al. | |
| 6,757,545 B2* | 6/2004 | Nowak et al. | 455/456.2 |
| 7,035,647 B2 | 4/2006 | De Verteuil | |
| 7,085,578 B2* | 8/2006 | Barclay et al. | 455/457 |
| 7,117,371 B1* | 10/2006 | Parthasarathy et al. | 713/187 |
| 7,120,254 B2* | 10/2006 | Glick et al. | 380/258 |
| 2002/0193121 A1 | 12/2002 | Nowak et al. | |
| 2004/0104097 A1* | 6/2004 | Ngee | 194/210 |
| 2005/0181805 A1* | 8/2005 | Gallagher | 455/456.1 |
| 2005/0186967 A1 | 8/2005 | Ozluturk | |
| 2005/0204014 A1* | 9/2005 | Yao et al. | 709/217 |
| 2005/0251440 A1* | 11/2005 | Bednarek | 705/10 |
| 2006/0077095 A1* | 4/2006 | Tucker et al. | 342/357.08 |
| 2006/0217885 A1* | 9/2006 | Crady et al. | 701/213 |
| 2007/0132550 A1* | 6/2007 | Avraham et al. | 340/5.21 |
| 2007/0149212 A1* | 6/2007 | Gupta et al. | 455/456.1 |
| 2008/0171559 A1* | 7/2008 | Frank et al. | 455/456.5 |

FOREIGN PATENT DOCUMENTS

| | | |
|---|---|---|
| WO | WO 97/38548 A1 | 10/1997 |
| WO | WO 00/27143 A1 | 5/2000 |
| WO | WO 02/076118 A1 | 9/2002 |

(Continued)

OTHER PUBLICATIONS

Brandt, Joel, et al. "Lash-Ups: A Toolkit for Location-Aware Mash-Ups," http://hci.stanford.edu/research/lash-ups/, 4 pages (retrieved May 29, 2007).

(Continued)

*Primary Examiner* — Marivelisse Santiago Cordero
*Assistant Examiner* — Qun Shen
(74) *Attorney, Agent, or Firm* — Nathan O. Greene; Brinks Hofer Gilson & Lione

(57) ABSTRACT

A centralized location system includes a location update application programming interface (API) to receive varying types of location inputs for a user from at least one location-providing application. A memory stores a location of the user and the location inputs, wherein the location update API periodically updates in the memory the location inputs when location updates are received from the at least one location-providing application. A location export API, upon request from a location-based service application, processes the location inputs to estimate a location of the user, which location estimate replaces the stored location in memory and is sent to the location-based service application. A user interface enables the user to specify a location granularity for at least one of the at least one location-providing application and the location-based service application.

23 Claims, 6 Drawing Sheets

FOREIGN PATENT DOCUMENTS

| | | |
|---|---|---|
| WO | WO 2005/003920 A2 | 1/2005 |
| WO | WO 2005/081796 A2 | 9/2005 |

OTHER PUBLICATIONS

Gangemi, Jeffrey, "Fine-Tuning Local Search," http://www.businessweek.com/print/smallbiz/Content/dec2006/sb20061226_633901.htm, 2 pages (Dec. 26, 2006).

Loki for Internet Explorer, http://software.techrepublic.com.com/download.aspx?docid=290960, 2 pages (retrieved May 8, 2007).

Skyhook Wireless, http://www.skyhookwireless.com/, 12 pages (retrieved May 29, 2007).

Trackut: How it works, http://www.trackut.com/help.php, 2 pages (retrieved May 8, 2007).

* cited by examiner

400

```
┌─────────────────────────────────────────────────────────────┐
│ Receive from User Location Granularity for a Location-Providing   404 │
│ Application and a Location-based Service Application        │
└─────────────────────────────────────────────────────────────┘
                              ↓
┌─────────────────────────────────────────────────────────────┐
│ Receive Location Inputs From at least one Location-Providing Application   408 │
└─────────────────────────────────────────────────────────────┘
                              ↓
┌─────────────────────────────────────────────────────────────┐
│ Store Location Inputs in a Database According to Specified   412 │
│ Location Granularity                                        │
└─────────────────────────────────────────────────────────────┘
                              ↓
┌─────────────────────────────────────────────────────────────┐
│ Receive Query from a Location-based Service Application     416 │
└─────────────────────────────────────────────────────────────┘
                              ↓
┌─────────────────────────────────────────────────────────────┐
│ Process Location Inputs Together to Formulate Estimate of   420 │
│ Current User Locaiton                                       │
└─────────────────────────────────────────────────────────────┘
                              ↓
┌─────────────────────────────────────────────────────────────┐
│ Update the Location of the User in Memory with the Estimate of   424 │
│ the Current Location                                        │
└─────────────────────────────────────────────────────────────┘
                              ↓
┌─────────────────────────────────────────────────────────────┐
│ Send Updated Location of User to the Location-based Service Application   428 │
│ According to Specified Location Granularity                 │
└─────────────────────────────────────────────────────────────┘
                              ↓
┌─────────────────────────────────────────────────────────────┐
│ Receive a Second Query from a Location-based Service Application   432 │
│ Before Receiving Additional Location Updates                │
└─────────────────────────────────────────────────────────────┘
                              ↓
┌─────────────────────────────────────────────────────────────┐
│ Send the Stored Location to the Location-based Service Application   436 │
└─────────────────────────────────────────────────────────────┘
```

CENTRALIZED LOCATION BROKER

BACKGROUND

1. Technical Field

The disclosed embodiments relate to a system and its methods for centralizing location updates, and more particularly, for centralizing location updates for location-based applications based on receipt of location inputs from location-providing applications.

2. Related Art

Consumers are becoming increasingly mobile. This increase in mobility creates many opportunities for organizations to provide consumers with location-based content and services. For example, a consumer may subscribe to a location-based restaurant review service that presents the consumer with a list of popular eateries that are located within driving distance of the consumer's current location. This service may also use the time of day to customize the list based on the type of meal (e.g., breakfast, lunch, or dinner). Consumers generally value this type of location-based content more than traditional content because it is more focused, relevant, and useful. Another service may provide a way that friends can track each other's locations, or other more user-integrated type services. Location-based content is information provided to a consumer that is keyed to a past, present or future geographic location of the consumer. Similarly, location-based services are services keyed to geographic location information for the consumer.

Additionally, the sources of location information related to a user of such applications have grown in recent years. These include devices that supply, for instance, a global positioning satellite (GPS) latitude and longitude coordinate set, a Global System for Mobile Communications (GSM) cell tower identifier, and a location related to a Wi-Fi access point media access control (MAC) address. Applications that integrate location information as part of a service provided to a user have heretofore used a single location source (or type of source) to provide location updates, and generally the location information obtained is destined for a single device or application.

SUMMARY

By way of introduction, the embodiments described below include a system and methods for centralizing location updates in a system for providing updated user locations to location-based service applications, and in which third party location-providing applications also may participate.

In a first aspect, a centralized location system includes a location update application programming interface (API) to receive varying types of location inputs for a user from at least one location-providing application. A memory stores a location of the user and the location inputs, wherein the location update API periodically updates in the memory the location inputs when location updates are received from the at least one location-providing application. A location export API, upon request from a location-based service application, processes the location inputs to estimate a location of the user, which location estimate replaces the stored location in memory and is sent to the location-based service application. A user interface enables the user to specify a location granularity for at least one of the at least one location-providing application and the location-based service application.

In a second aspect, a method is disclosed for centralizing management of user location for third party use with a centralized location system. The system receives from a user a location granularity for at least one location-providing application and for at least one location-based service application. The system receives location inputs from the at least one location-providing application. The system stores the location inputs in a database according to the location granularity specified by the user for each location-providing application. The system receives a query from a location-based service application for the location of the user. The system processes the location inputs together to formulate an estimate of the current location of the user, and updates the location of the user in memory with the estimate of the current location. The system may then send the updated location of the user to the location-based service application in response to the query and in accordance with the location granularity specified by the user for the location-based service application.

In a third aspect, a method is disclosed for a method for centralizing management of user location for third party use with a centralized location system. A location-based service application registers system access, and receives at least one of an application token and a secret. The location-based service application queries a location of a user from the system after registration, wherein the system identifies the location-based service application based on at least one of the received application token and a hashed encrypted version of the secret. The location-based service application receives an updated location for the user according to a location granularity specified by the user for the location-based service application, wherein the updated location is estimated from processing location inputs for the user obtained from at least one location-providing application.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 4 is a flow chart of an exemplary method for centralizing location updates for location-based service applications based on inputs received from location-providing applications.

DETAILED DESCRIPTION

Figure 1:
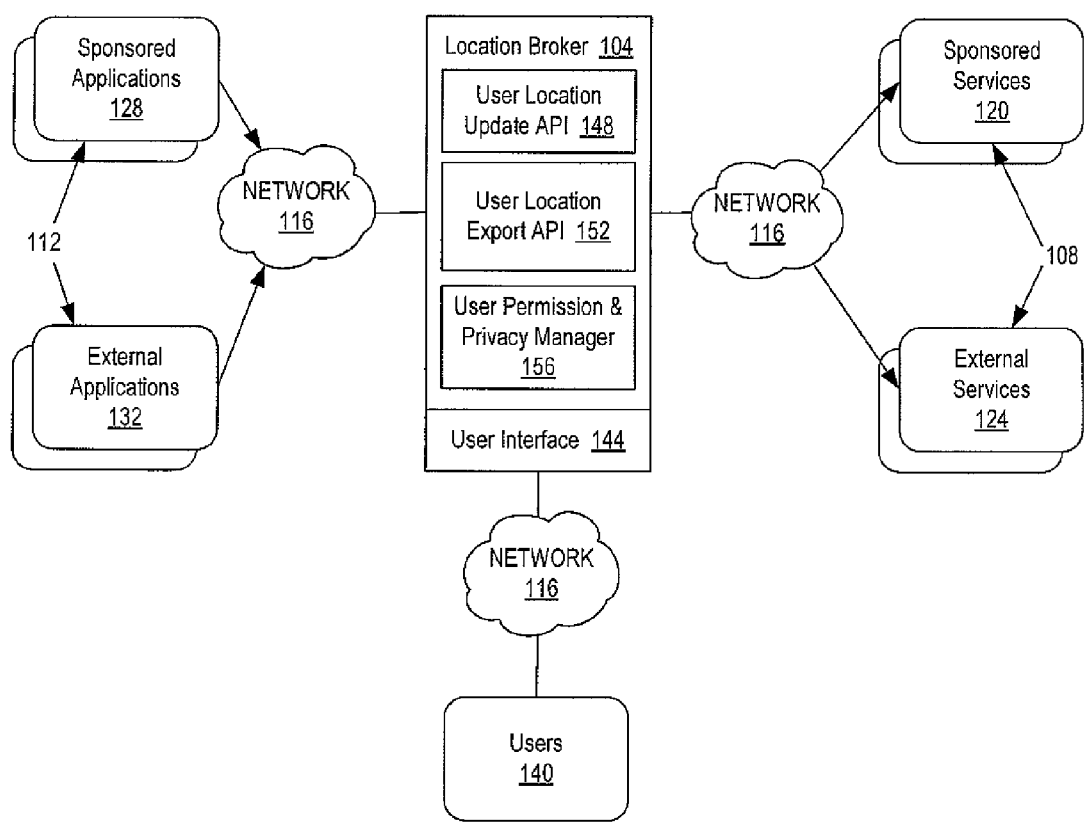
FIG. 1 is a diagram of an exemplary centralized location system including a location broker that updates a location for service applications according to location inputs received from one or more location-providing applications.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Currently, there are location tracking techniques that use, for example, one of global positioning satellite (GPS) latitude and longitude coordinate sets, Global System for Mobile Communications (GSM) cell tower identifiers, or locations related to Wi-Fi access point media access control (MAC) addresses. No interface exists, however, that provides a robust, reliable, and centralized means for ascertaining and updating a user's location that could integrate multiple types location inputs, including from third party applications. What is needed is a centralized location broker for third-parties to obtain and update a user's location. The broker should also allow a user to define the level of location precision available to specific third-parties. For example, a user may desire to only expose the user's current city to the third-parties, instead of a more precise location, such as the block or intersection in which the user is located. Thus, the location broker facilitates the adoption of location-based services by allowing users to selectively expose their location to service providers.

FIG. 1 is a diagram of an exemplary centralized location system 100 including a location broker 104 that updates a location for service applications 108 according to location inputs received from one or more location-providing applications 112. Communication, of course, takes place over a network 116 that may include the Internet, an Intranet, a local area network (LAN), a wide area network (WAN), or other network. The location-based service applications 108 may include sponsored services 120 such as those provided by the entity that owns and/or controls the location broker 104. The service applications 108 may also include external, third party services 124 that integrate into their development and use the benefits of the location broker 104 as described herein. The location-based service applications 108 may include, but are not limited to, location-based alerts, location-based advertising, coupon distribution, and services that use the location of the user to provide focused content.

It would be impossible to include all types of location-based service applications because many are conceivable, and all are contemplated here. For instance, a user location could be used to tag Flickr® photos or other media to record where the user 140 was when the media was recorded. Also, user 140 could be allowed to annotate records of holidays or commuting patterns, or for easily tracking tax deductible miles. Additionally, presence indicators may also be included, such as putting a badge on a user website that indicates user location, which location is periodically updated through the location broker 104.

Furthermore, the location-providing applications 112 may include sponsored applications 128 and external, third-party applications 132. Examples of location-providing applications 112 include, but are not limited to, devices that supply location inputs such as a GPS latitude and longitude coordinate sets, a GSM cell tower identifier, and a Bluetooth identifier. Further examples of location-providing applications 112 also include persons or entities that supply the location inputs, such as a user-specified identifier or location, or a third party location tracking application such as Plazes® (based on tracking Wi-Fi access point MAC addresses). Plazes® is a social community that connects friends by use of a client downloadable through beta.plazes.com; the company is headquartered in Zurich and Berlin. Recently, updates to location were made available through the Plazes® website or through text messaging, both of which require the user to enter his or her location manually.

Users 140 are the beneficiaries of the system 100 and are the customers to the location-based service applications 108. Users 140 communicate with the location broker 104, usually also over the network 116, and through a user interface 144 of the location broker 104. The location broker 104 further includes a user location update application programming interface (API) 148 to update a location stored in the location broker 104 for each user 140 based on one or more location inputs from the location-providing applications. A user location export API 152 then communicatively interfaces with the location-based service applications 108 to provide updates of the users' locations upon request, or periodically, as an integral part of the services provided to the users 140.

To ensure attention to privacy on a need-to-know basis, the user 140 may, through the user interface 144 and in conjunction with a user permission and privacy manager 156 (variably referred to as "privacy manager 156"), configure a location granularity for reads and writes by applications 108 and 112, respectively, which participate in the system 100. The location granularity includes at least a level of location precision, which may include, but is not limited to, a street address, a zip code, a city, a state, a country, and a latitude/longitude coordinate set. While a current location as updated in the location broker 104 may be provided down to the street address, a given application 108, 112 may only be afforded access, as confined by the user 140, to a zip code or a city. In such a case, only the zip code or the city will be provided to the application 108, 112 upon request by the application 108, 112. In addition, the applications 108, 112 may also be cut off completely from any location information access, e.g. from reading and writing, respectively.

Location granularity control may also be a way by which the users 140 may adjust sensitivity to the reads or writes of their location, thereby also affecting accuracy of their location, as desired. The natural consequence of such control is that sometimes a user 140 will choose to prioritize privacy over accuracy. In this manner, the location broker 104 acts as a centralized interface for updating and exporting a user's location in accordance with the location granularity dictated by a user 140. The system 100 thus facilitates the creation, adoption, and wide-spread use of location-based services. The location-providing applications 112 may efficiently update the location of a user 140 and location-based service applications 108 may reliably receive the location of a user. In addition, the user 140 remains in control over the level of location precision distributed to the service providers.

Figure 2:
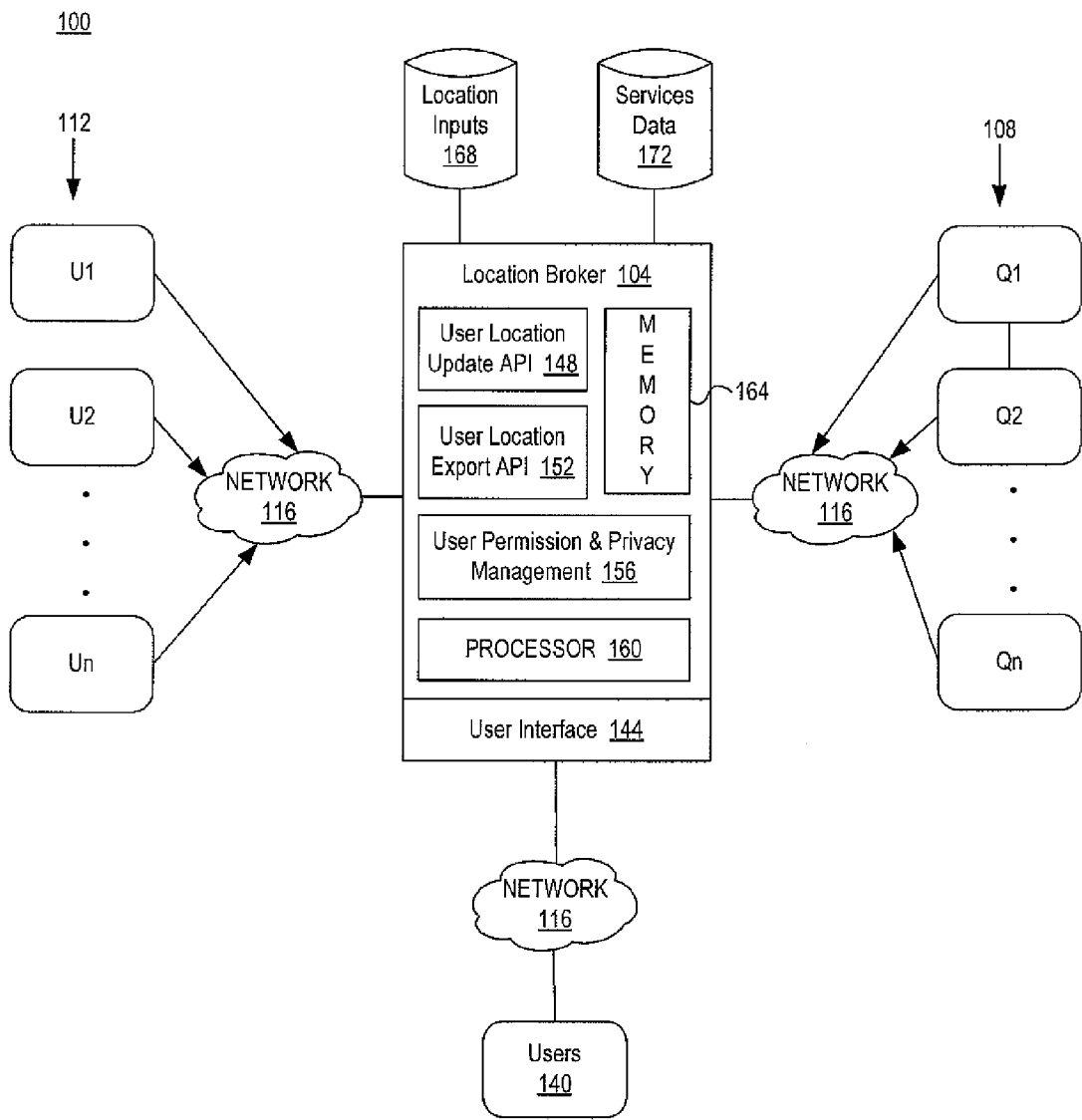
FIG. 2 is a more detailed diagram of the system displayed in FIG. 1, with a focus on the location broker.

FIG. 2 is a more detailed diagram of the system 100 displayed in FIG. 1, with a focus on the location broker 104. A plurality of location-based service applications 108 are designated as Q1, Q2, . . . Qn, and a plurality of location-providing applications 112 are designated as U1, U2, . . . Un, all able to communicate through the network 116 with the location broker 104. The location broker 104 includes, as before, the user interface 144, the user location update API 148, the user location export API 152, and the user permission and privacy manager 156.

Additionally, the location broker 104 may further include a processor 160, a memory 164, a location inputs database 168, and a service data database 172. One of skill in the art will appreciate that the databases 168 and 172 may be integrated in the memory 164 on a single server acting as a location broker 104, or may be located remotely across the network 116. One of skill in the art will also appreciate that the processor 160 may include hardware and/or software operatively executed on hardware, and may integrate one or more of the user location update API 148, the user location export API 152, the user permission and privacy manager 156, and the user interface 144.

To use the system 100, a user 140 signs up for one or more applications 108, 112 and authorizes them to, respectively, update their location and query their location at a certain location granularity. Again, the privacy manager 160 will facilitate this interaction by the user 140, providing the user 140 with configuration access to a current list of applications 108, 112. The users 140 are provided a username and password in order to identify themselves to the location broker 104 for future access. The users 140 are also issued an application token (or "userid") that the applications 108, 112 use to identify the user 140 in the system 100.

The applications 108, 112 may communicate with the location broker 104 through an authenticated API (148 and/or 152). The applications 108, 112 use this token (referred to in the API as an appid) and an application-specific secret to identify themselves to the location broker 104 when reading or writing user location data. The authentication works similar to a hash-based message authentication code in which submitted API parameters are combined with a shared secret (between the location broker 104 and each application 108, 112) by a one-way hash algorithm to generate a signature which ensures that API calls actually originate from an application 108, 112 that knows the secret (verified by encrypting the parameters and secret sent by the API with the same one-way hash algorithm and comparing this value to the submitted signature). The hash-based authentication code works as a unique signature, which can only be produced by introduction of the proper secret.

Additionally, a timestamp parameter may be required to prevent replays—that is, each application 108, 112 cannot query or update a user's location with a smaller timestamp value than has been previously supplied by that application 108, 112. Without knowledge of the shared secret, an attacker cannot formulate a request containing an updated timestamp; checking the timestamp ensures than a request intercepted by an attacker and sent unmodified will be rejected after the timestamp has expired (i.e. a request cannot be "replayed"). Username, passwords, tokens, secrets, and other account-specific information for users 140 and applications 108, 112 are stored in the services data database 172.

The location broker 104 stores in the location inputs database 168 the most recent location supplied by each location-providing application 108 for each user 140, and in accordance with the location granularity specified by each user 140. The location-providing applications 108 can specify location in a number of ways, which include, but are not limited to: a latitude/longitude coordinate set, a postal code, a street address, a GSM cell tower identifier, a Bluetooth identifier, a user-specified identifier or location, and an identifier from an external system (Plazes®, Upcoming.org, etc.). See also Table 1 below, which provides an exemplary manner of storing location data in the location inputs database 168.

One location per user-application pair is stored in the location inputs database 168, thus the location broker 104 generally provides access to a user's current location, not a location history of user locations. When a user's location is requested, the location broker 104 combines location information (raw data from database 168) for that user 140 into a current estimate of the user's location, which is returned in extensible markup language (XML) or another compatible format, which provides a standardized location-reporting format with which to export to location-based applications 108. To do so, the raw location inputs are jointly processed by at least the user location export API 152 and possibly also via other APIs (not shown) internal to the location broker 104 and which may be integrated as part of the user location update API 148 or the processor 160. One embodiment of such processing includes use of a set of software objects that are mapped to various input type parameters, such as shown in Table 1, wherein each object is accessed in turn according to precedence until the closest estimate of a user's location is achieved. The ordering of precedence as indicated is exemplary only, and is not intended to limit the scope of how raw location inputs are processed.

TABLE 1

Map of Objects to Processing Precedence

| | Parameter | Required | Format | Description | Precedence |
|---|---|---|---|---|---|
| Formatted Address | addr | (+city or postal) | String | Street address (e.g. 1350 University) - requires city or postal | 7 |

TABLE 1-continued

Map of Objects to Processing Precedence

| | Parameter | Required | Format | Description | Precedence |
|---|---|---|---|---|---|
| | city | (+state, country, or postal) | String | City name - requires state, country or postal | 11 |
| | state | N | String | State name | 12 |
| | postal | N (need + country if not US) | String | Postal code | 10 |
| | country | N | String | Country | 13 |
| GPS | lat | 1 | Float | Latitude (decimal degrees) | 1 |
| | lon | 1 | Float | Longitude (decimal degrees) | 1 |
| GSM | mnc | 3 | Int | Mobile Network Code | 9 |
| | mcc | 3 | Int | Country Code | 9 |
| | lac | 3 | Int | LAC (Location Area Identifier) | 9 |
| | cellid | 3 | Int | Cell ID (identifier) | 9 |
| Free-form | loc | N | String | Free-form location - the system 100 makes a best guess translation | 14 |
| | name | N | String | POI/AOI (area or person of interest) name or 3-letter Airport code - may include a user-specified identifier | 6 |
| External Identifier | woeid | N | Int | Where on Earth ID | 2 |
| | plazesid | N | String | Plazes ® Plaze key | 5 |
| | ylocalid | N | Int | Y! ® Local ID | 3 |
| | upvenueid | N | Int | Upcoming.org venue ID | 4 |
| Street Intersection | street1 | 2 (+postal or city) | String | Street name 1 for intersection lookup | 8 |
| | street2 | 2 | String | Street name 2 for intersection lookup | 8 |

Note that Table 1 is in abstract form and is for exemplary purposes only to show one way that location inputs of different types may be stored and processed to produce a single location output. If the location broker 104 finds a valid location from precedence 1, the location broker 104 uses that location; if not, the location broker 104 moves on to location input data with precedence 2, etc. In the "Required" column, corresponding numbers indicate that the parameters must all be present if any are present. Note also that while location inputs based on Wi-Fi access point MAC addresses is not included in Table 1, they could be, and such inputs are also available though the Plazes® system (among others) from which the location broker 104 accepts Plaze identifiers.

Additionally, in some embodiments, a user location that is sent by the location broker 104 in response to a location-based service application 108 query may also include other location-sensitive metadata, such as the nearest metro station, current weather forecast, and current local time. Also, such metadata (or other message included with the response from the location broker 104) may include a note that specifies the types of location inputs that were available and used in estimating the location or the user 140, including what method of processing was used to combine location inputs. An example of how the system 100 works in conjunction with the processing of raw location inputs may be helpful.

Figure 3A:
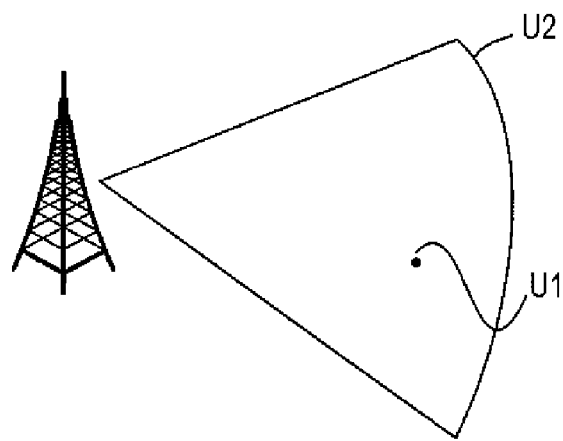
FIGS. 3A and 3B are examples of how various location input types are processed together to best estimate a location or area where a user is currently located.
Figure 3B:
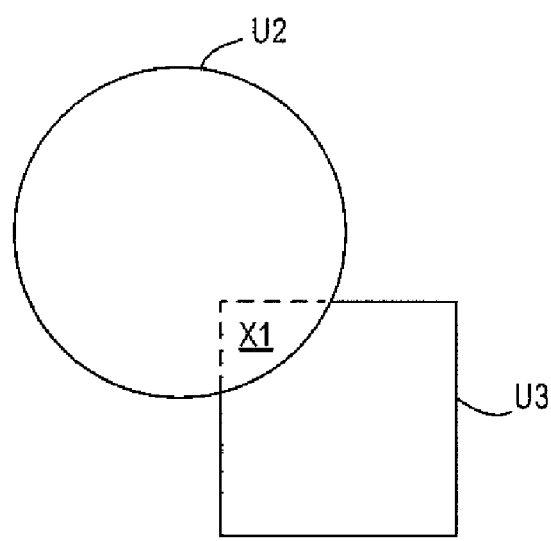

FIGS. 3A and 3B are examples of how various location input types are processed together to best estimate a location or area where a user 140 is currently located. Assume a user 140 has authorized two location-providing applications 112, U1 and U2, to update the user's location and has authorized two location-based applications 108, Q1 and Q2, to query the user's location. The user grants Q1 permission to query a user's location as precisely as possible, while Q2 is only given permission to query the user's current zip code.

The applications U1 and U2 periodically send location updates to the location broker 104, which are stored in the location inputs database 168 similarly as indicated in Table 1.

Until there is a query for the user's location, the location updates simply sit in the location inputs database 168 unprocessed, in whatever form they were supplied by U1 and U2. For our example, assume that U1 submits GPS coordinates at time 12:01 and U2 submits GSM cell tower information at 12:02.

At 12:03, Q1 requests the user's location. The location broker 104 sees that there have been location updates since the last query and starts to process the raw location inputs from U1 and U2. The result of this processing for each raw location is an XML structure containing at least one of the following: a human-readable location (one or more of a street address, a zip code, a neighborhood, a state, etc.); a bounding box (the north, south, east, and west borders of the smallest area to which the raw location can be resolved); and a hierarchy of containing locations each identified by a location identifier (e.g., the street address of an office at "1350 University Ave" is contained by the zip code 94704, which in turn is contained by the city of Berkeley, which is contained by California, etc.).

The location broker 104 then caches the processed locations in memory 164 corresponding to the recent raw inputs from U1 and U2. In this example, the location broker 104 sees that the GPS point supplied by U1 is contained by the area covered by the cell tower information submitted by U2, as shown in FIG. 3A. Because the location inputs are in agreement and the timestamps are very similar, the location broker 104 returns the GPS point (the most precise location available) to Q1. This point may also be converted by reverse geo-coding into a street address before being sent to Q1.

Now, at 12:05 Q2 requests the user's location. The location broker 104 sees that there have not been any updates since the user's location was processed in response to Q1's query. Q2, however, only has permission to access the user's location at the zip code level, so the cached location hierarchy is traversed until a zip code is found. This zip code (and associated bounding box) is then returned to Q2.

If additional queries are received before any more location updates the cached location can be returned immediately, without the overhead of processing the raw location inputs. When new raw updates are received, they overwrite the previous raw update from each application (U1 or U2) as there is one location per updating application 112 per user 140. For instance, say a new update comes from U2 that changes the possible geographical area of the user 140 based on new GSM identifiers, as shown in FIG. 3B. The user 140 is out of range of sufficient satellites to obtain a GPS signal, so U1 updates its information with the location broker 104 as empty (or zero). There is a new location-providing application 112 (U3), however, made available based on a user identifier that indicates arrival in an area of interest (U3). The new updates then remain untouched until there is a new query.

In response to a new query, the new location updates are processed, the cached processed location is re-examined and a new location based on the most recent updates is generated and cached. In this case, because a free-form identifier (Table 1) carries a priority of 6, U3 takes precedence over U2 (the new GSM area that carries a priority of 9). Given that U2 and U3 intersect, however, the intersection area, X1, is returned as the most likely area in which the user 140 is located.

Now, assume that area X1 covers approximately half a block in the suburbs of a city. The location broker 104 may determine from a formatted address previously stored and still current in the location inputs database 168 that the stored address is located within area X1. This address will be returned to Q1 as the most precise location available, while the zip code corresponding to the address is returned to Q2. If such a formatted address were not available or is not near the area X1, then the location broker 104 would return to Q1 a nearest street intersection, and again, to Q2 the zip code of that street intersection.

The above examples illustrate relatively simple cases. The location broker 104 should also be able to resolve conflicting location information from multiple location-providing applications 112 and may be able to resolve multiple raw input locations to a location more precise than any of the single raw input locations. Additionally, because the location broker 104 resolves one or more raw location inputs into a single location, e.g. by use of a bounding box plus reverse geo-coding in which a GPS coordinate is converted into a street address, applications 108, 112 need not worry about formatting or translation location formats. The location broker 104 does all of these, making it seamless and easy for application developers.

The location broker 104 employs internal caching in the location inputs 168 database and memory 164 (which could be combined) to efficiently handle situations in which location updates are much more frequent than queries or situations where queries are much more frequent than updates. It is only the situation where updates and queries are interleaved that the location broker 104 must do a lot of work. Additionally, because the location broker 104 stores the users' locations centrally, location updates from one application can be consumed by another. In fact updates from one device can be queried from another physical device (e.g. a phone can update the location accessed by a laptop or vice versa) or updates from one user 140 could be consumed by another (e.g. given the right permissions, friends can watch where each other are currently located).

FIG. 4 is a flow chart 400 of an exemplary method for centralizing location updates for location-based service applications 108 based on inputs received from location-providing applications 112. A location broker 104, at step 404, receives from a user 140 a location granularity for at least one location-providing application 112 and for at least one location-based service application 108. At step 408, the location broker 104 receives location inputs from the at least on location-providing application 112. At step 412, the location broker 104 stores the location inputs in a database 168 according to the location granularity specified by the user 140 for each location-providing application 112. At step 416, the location broker 104 receives a query from a location-based service application 108 for the location of the user 108. At step 420, the location broker 104 processes the location inputs together to formulate an estimate of the current location of the user 140.

At step 424, the location broker 104 updates the location of the user 140 in memory 164 with the estimate of the current location. At step 428, the location broker 104 sends the updated location of the user 140 to the location-based service application 108 in response to the query and in accordance with the location granularity specified by the user 140 for the location-based service application 108. At step 432, the location broker 104 receives a second query from a location-based service application 108 before receiving any further location inputs from the at least one location-providing application 112. At step 436, the location broker 436 sends the location of the user 140 stored in memory 164 to the location-based service application 108 in response to the second query and in accordance with the location granularity specified by the user 140 for the location-based service application 108.

Figure 5:
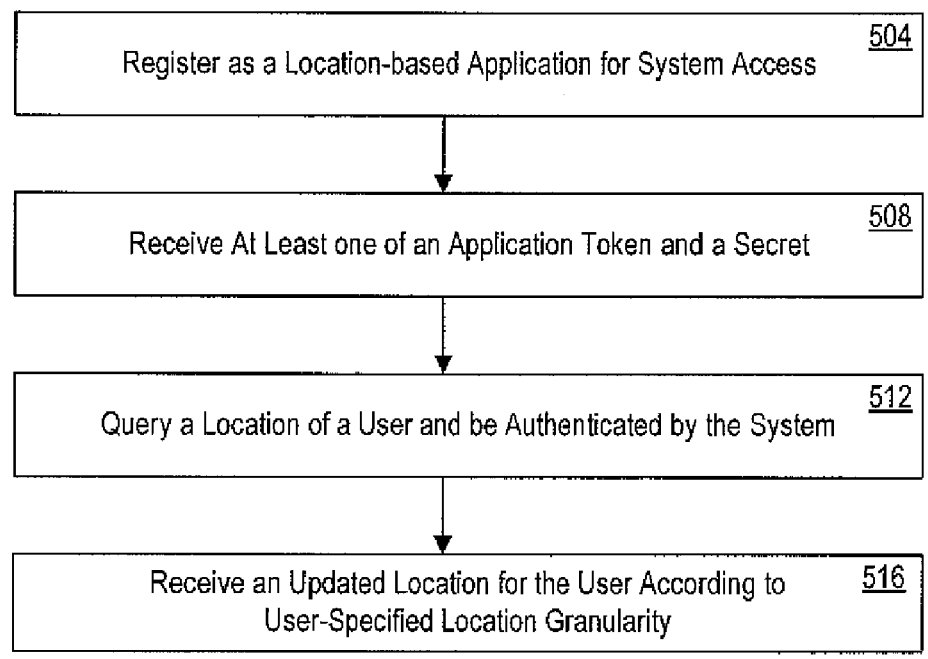
FIG. 5 is a flow chart of a further exemplary method for centralizing location updates for location-based service applications based on inputs received from location-providing applications.

FIG. 5 is a flow chart 500 of a further exemplary method for centralizing location updates for location-based service applications 108 based on inputs received from location-providing applications 112. A location-based service application 108, at step 504, registers with a location broker system 100 for system access, and at step 808, receives at least one of an application token and a secret from the location broker 104. At step 512, the location-based service application 108 queries a location of a user 140 from the system 100 after registration, wherein the system 100 identifies the location-based service application 108 based on at least one of the received application token and a signature based on a hash of the query parameters and the secret. At step 516, the location-based service application 108 receives from the system 100 an updated location for the user 140 according to a location granularity specified by the user, wherein the updated location is estimated from processing location inputs for the user 140 obtained from at least one location-providing application 112.

Figure 6:
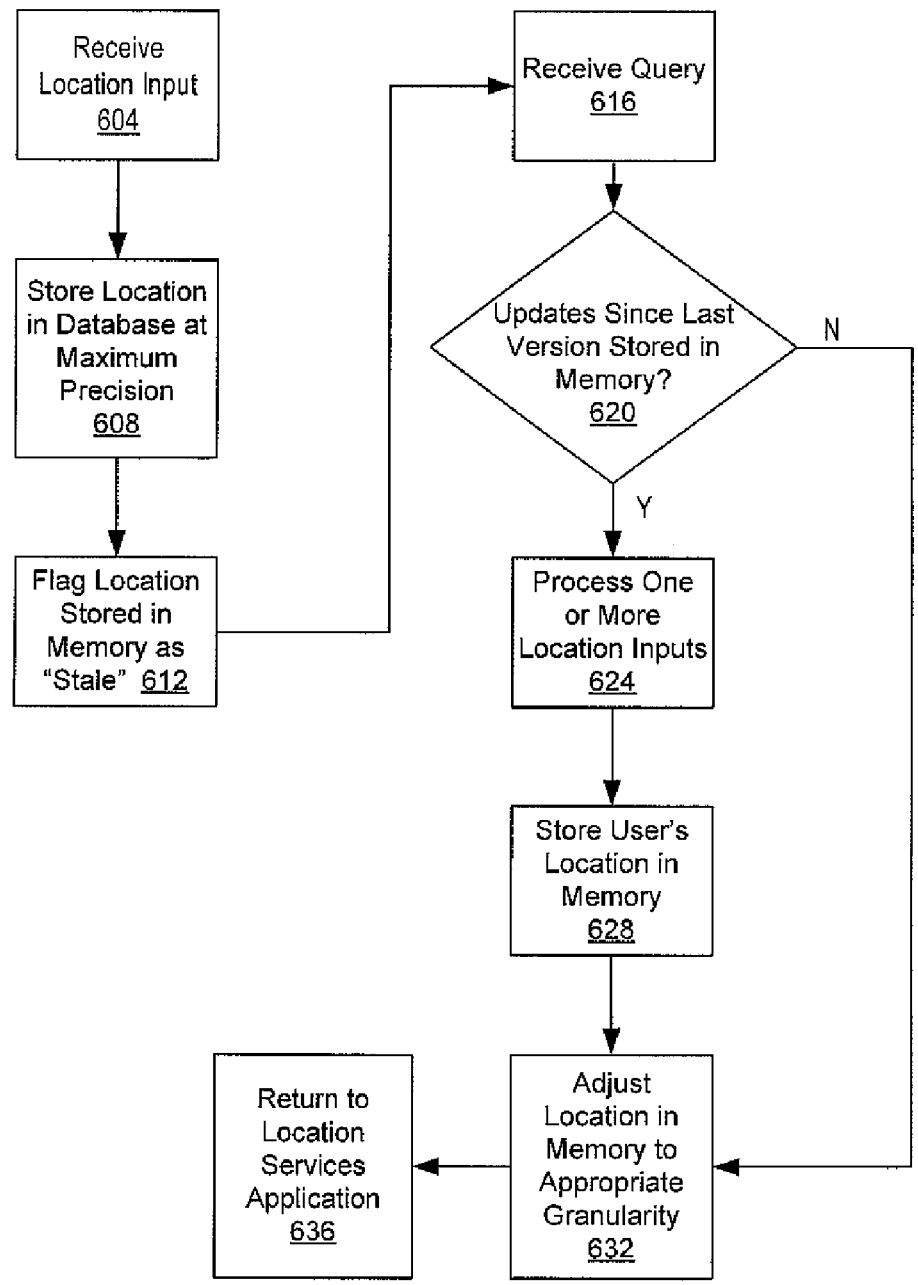
FIG. 6 is a flow chart of another method for centralizing location updates for location-based service applications based on inputs received from location-providing applications.

FIG. 6 is a flow chart 600 of another method for centralizing location updates for location-based service applications 108 based on inputs received from location-providing applications 112. At step 604, the location broker 104 receives location inputs from the location-providing applications 112. At step 608, the location broker 104 stores in the location inputs database 168 the location inputs, and does so at the maximum precision possible depending on the location granularity specified by the user 140 as discussed previously. At step 612, the location broker 104 flags the location stored in memory 164 as stale. At step 616, the location broker 104 receives a query from a location-based service application 108. At step 620, the location broker 104 determines whether it has received updates since the last version of the location was stored in memory 164.

If the location broker 104 has received location input updates since the last version of the user's location was stored, it processes the one or more location inputs to produce an updated user location at step 624. At step 628, the location broker 104 stores the updated user location in memory 164. At step 632, the location broker 104 adjusts this location stored in memory 164 to the granularity specified for the querying location-based service application 108 by the user 140 as discussed previously. Finally, at step 636, the location broker 104 returns to the location services application for further processing of updates of the same or different users 140.

If the location broker 103 has not received input updates since the last version of the user's location was stored, it skips to step 632 and adjust the location in memory to the appropriate granularity as specified by the user 140 for the querying location-based service application 108. As before, at step 636, the location broker 104 returns to the location services application 108 for further processing of updates of the same or different users 140.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A centralized location system comprising:
   a location update application programming interface (API) to receive varying types of location inputs for a user from at least one location-providing application, wherein receiving location inputs from the at least one location-providing application comprises receiving from the user location inputs including at least one selected from the group consisting of a user-specified identifier or location and an identifier provided by a third party location tracking application;
   a memory to store a location of the user and the location inputs, wherein the location update API periodically updates in the memory the location inputs when location updates are received from the at least one location-providing application;
   a location export API to, upon request from a location-based service application, process the location inputs to estimate a location of the user, which location estimate replaces the stored location in memory and is sent to the location-based service application;
   a processor configured to:
   register the at least one location-providing application and the location-based service application for system access by providing to the applications an application token and a secret;
   compare a hashed encrypted version of the secret provided by an application attempting access with a hashed encrypted version thereof stored at registration; and
   identify the application attempting access upon finding a match of the hashed encrypted secret and verifying the application token;
   a user interface to enable the user to specify a location granularity comprising a level of location precision to which one or more of the at least one location-providing application and the location-based service application are authorized access;
   wherein the memory stores the location inputs from the at least one location-providing application according to the location granularity associated therewith as authorized by the user, and wherein the location sent to the location-based service application is confined to the granularity authorized for access by the user.

2. The system of claim 1, wherein the at least one location-providing application comprises a device that supplies the location inputs including at least one selected from the group consisting of a global positioning satellite (GPS) latitude/longitude coordinate set, a Global System for Mobile Communications (GSM) cell tower identifier, and a Bluetooth identifier.

3. The system of claim 1, wherein the at least one location-providing application comprises an entity that supplies the location inputs including at least one selected from the group consisting of a user-specified identifier or location and an identifier provided by a third party location tracking application.

4. The system of claim 1, wherein the location granularity comprises at least one selected from the group consisting of an address, a zip code, a city, a state, a country, and a latitude/longitude coordinate set.

5. The system of claim 1, wherein the location-based service application comprises location-based coupon distribution.

6. The system of claim 1, wherein the processed location inputs from the at least one location-providing application comprises an extensible markup language (XML) structure including one or more of a street address, a zip code, a neighborhood, a city, a state, and a longitude/latitude coordinate set.

7. The system of claim 6, wherein the one or more of the street address, the zip code, the neighborhood, the city, the state, and the longitude/latitude coordinate set are ordered in a hierarchy of containing locations.

8. The system of claim 1, wherein the processed location inputs from the at least one location-providing application comprise an extensible markup language (XML) structure including a smallest definable bounding box having defined borders on the north, south, east, and west thereof according to the specified location granularity of the at least one location-providing application.

9. The system of claim 1, further comprising:
   an authenticator to communicate with APIs and to register developers of location-providing, and location-based, service applications, wherein the developers are issued at least one of the application token and the secret so that the APIs recognize the location-providing, and location-based, service applications when they attempt to read or write the user location.

10. The system of claim 1, wherein location updates sent to a first location-based service application on a first user device causes the same location update to be sent to one of the first and a second location-based service application on a second user device by the first user device.

11. A method for centralizing management of user location for third party use with a centralized location system, the method being carried out by a computer having a processor and memory, the method comprising:
- receiving from a user, through a user interface of the computer, a location granularity comprising a level of location precision to which at least one location-providing application and at least one location-based service application are authorized access;
- registering the at least one location-providing application and the at least one location-based service application for system access by providing to the applications an application token and a secret;
- comparing a hashed encrypted version of the secret provided by an application attempting access with a hashed encrypted version thereof stored at registration;
- identifying the application attempting access upon finding a match of the hashed encrypted secret and verifying the application token;
- receiving location inputs from the at least one location-providing application through a location update application programming interface (API) of the computer, wherein receiving location inputs from the at least one location-providing application includes receiving from the user or an entity location inputs including at least one selected from the group consisting of a user-specified identifier or location and an identifier provided by a third party location tracking application;
- storing the location inputs in a database, coupled with the computer as stored in the memory, according to the location granularity authorized by the user for access by each location-providing application;
- receiving, by the computer, a query from a location-based service application for the location of the user;
- processing, by a location export API of the computer, the location inputs together to formulate an estimate of the current location of the user;
- updating, by the computer, the location of the user in memory with the estimate of the current location; and
- sending the updated location of the user to the location-based service application in response to the query and in accordance with the location granularity authorized by the user for access by the location-based service application.

12. The method of claim 11, wherein the location granularity comprises at least one of an address, a zip code, a city, a state, a country, and a latitude/longitude coordinate set.

13. The method of claim 11, further comprising:
- receiving a second query from a location-based service application before receiving any further location inputs from the at least one location-providing application; and
- sending the location of the user stored in memory to the location-based service application in response to the second query and in accordance with the location granularity specified by the user for the location-based service application.

14. The method of claim 11, wherein the location-based service application comprises a first location-based service application, and sending a location update to the first location-based service application on a first user device causes the same location update to be sent to one of the first and a second location-based service application on a second user device by the first user device.

15. The method of claim 11, wherein the at least one location-providing application comprises a plurality of location-providing applications that supply varying types of location inputs, wherein processing the location inputs together comprises standardizing the varying types into a single format.

16. The method of claim 11, wherein the at least one location-providing application comprises a device that supplies the location inputs including at least one selected from the group consisting of a global positioning satellite (GPS) latitude/longitude coordinate set, a Global System for Mobile Communications (GSM) cell tower identifier, and a Bluetooth identifier.

17. The method of claim 11, wherein the at least one location-based service application comprises at least one selected from the group consisting of tagging media content, annotating data records, and use of presence indicators to track location continuously.

18. A method for centralizing management of user location for third party use with a centralized location system, the method executable by a computer having a processor and memory, comprising:
- registering, by the processor, at least one location-providing application and a location-based service application for system access by receiving from the applications an application token and a secret;
- comparing, by the processor, a hashed encrypted version of the secret provided by an application attempting access with a hashed encrypted version thereof stored at registration;
- identifying, by the processor, the application attempting access upon finding a match of the hashed encrypted secret and verifying the application token;
- querying, by the processor, a location of a user from the system after registration, wherein the computer receives location inputs from at least one selected from the group consisting of a user-specified identifier or location and an identifier provided by a third party location tracking application; and
- receiving, by the computer, an updated location for the user according to a location granularity comprising a level of location precision specified by the user to which the location-based service application is authorized access, wherein the updated location is estimated from processing location inputs for the user obtained from the at least one location-providing application, wherein the location sent to the location-based service application is confined to the granularity as authorized by the user.

19. The method of claim 18, wherein the at least one location-providing application comprises an entity that supplies the location inputs including at least one selected from the group consisting of a user-specified identifier or location and an identifier provided by a third party location tracking application.

20. The method of claim 18, wherein the at least one location-based service application comprises location-based coupon distribution.

21. The method of claim 18, wherein the at least one location-based service application comprises a first location-based service application, and receiving an updated location for the user comprises receiving the updated location from a second location-based service application on another device with which the first location-based service application is in communication.

22. The method of claim 11, wherein sending the updated location of the user comprises sending at least one of location-sensitive metadata and location processing-specific information.

23. The method of claim 18, wherein the at least one location-providing application comprises a device that supplies the location inputs including at least one selected from the group consisting of a global positioning satellite (GPS) latitude/longitude coordinate set, a Global System for Mobile Communications (GSM) cell tower identifier, and a Bluetooth identifier.

* * * * *